United States Patent [19]
Geurts

[11] 3,760,882
[45] Sept. 25, 1973

[54] FULL HYDRAULIC EARTH WORKING IMPLEMENT

[75] Inventor: Cletus J. Geurts, Gibson City, Ill.

[73] Assignee: Geurts, Inc., Minneapolis, Minn.

[22] Filed: Mar. 16, 1971

[21] Appl. No.: 124,753

Related U.S. Application Data

[63] Continuation-in-part of Ser. No. 486,712, Sept. 13, 1965, and a continuation-in-part of Ser. No. 666,047, Sept. 7, 1967.

[52] U.S. Cl. ............................. 172/265, 172/705
[51] Int. Cl. ............................................. A01b 61/00
[58] Field of Search .................... 172/266, 264, 261, 172/265, 705; 267/64; 137/593

[56] References Cited
UNITED STATES PATENTS

| 3,032,122 | 5/1962 | Geurts | 172/264 |
| 3,321,031 | 5/1967 | Evans | 172/705 X |
| 3,042,122 | 7/1962 | Anderson | 172/265 |
| 3,420,273 | 1/1969 | Greer | 172/265 UX |

*Primary Examiner*—Robert E. Pulfrey
*Assistant Examiner*—Stephen C. Pellegrino
*Attorney*—Burd, Braddock & Bartz

[57] ABSTRACT

An earth working implement having a high ground clearance beam connected to a frame unit having side plates. An articulated linkage is connected to an earth working tool and pivotally joined to the frame unit. Tracks on the side plates cooperate with rollers on the standard to guide the movement of the plow bottom to a trip position without the plow bottom going below its normal earch working position. A hydraulic cylinder acting on the standard continuously holds and biases the plow bottom to its earth working position.

27 Claims, 8 Drawing Figures

INVENTOR.
CLETUS J. GEURTS
BY
Burd, Braddock & Bartz
ATTORNEYS

FULL HYDRAULIC EARTH WORKING IMPLEMENT

CROSS REFERENCE TO RELATED APPLICATION

This application is a continuation-in-part of U.S. application Ser. No. 486,712 filed Sept. 13, 1965 and U.S. Patent application Ser. No. 666,047 filed Sept. 7, 1967.

BACKGROUND OF THE INVENTION

A conventional agriculture plow and similar earth working tools have one or more plow bottoms attached to beams mounted on a generally horizontal frame. The frame is connected to a draft vehicle, as a tractor, with an adjustable hitch. The plow beams are located relatively close to the ground when the plow bottoms are in ground working position. The result is that in fields with large amounts of trash, as corn stalks, straw, beans and the like, the low clearance of the plow beams causes the trash to collect and block the plow. The collected trash interferes with the action of the colters and the turning of the trash by the plow bottoms. It is a common practice to mulch or chop the trash prior to plowing. This consumes considerable time, power and expense. Chopping and mulching devices have been applied to plows to break up the trash.

In addition to trashy conditions of agricultural lands, many soils may contain rocks, or similar obstructions which must be cleared by the plow bottom. Plow bottom trip releases are used to permit the plow bottoms to move back and over the obstructions. These trip releases are not particularly suitable with use in a high clearance plow. By increasing the height of the plow beams, there is a corresponding increase in the length of the standard and considerable lateral loading of the standard. This subjects the standards and their connecting linkages to suitable twisting and torsion forces. The result is excessive wear, and considerable breakage of the linkage when conventional plows are modified as a high clearance plow. An example of a low beam plow is shown in U.S. Pat. No. 3,349,855.

Several plow bottom reset designs have been developed for high beam plows. Geurts U.S. Pat. Nos. 3,032,122 and 3,461,973 both show guide mechanisms for controlling the trip movement of the plow bottom. The spring trip release in Geurts Pat. No. 3,032,122 does not operate in combination with a hydraulic cylinder to hold the plow bottom in the earth working position, provide a biasing force during the upward movement of the plow bottom and provide a continuous biasing force to return the plow bottom to its earth working position. The present invention has overcome these deficiencies of the trip release of Geurts Pat. No. 3,032,122.

SUMMARY OF INVENTION

This invention relates to an earth working implement and more particularly to an automatic holding and release mechanism for a plow bottom to prevent the plow share from breaking, bending or other injury when striking an obstruction.

The earth working implement has a high beam and is equipped with a hydraulic biased standard connected to a guided track and roller mechanism. Hydraulic cylinders are located in a position which does not in interfere with the trash on the ground. The track and roller guide mechanism increases lateral strength and stability of the standard and permits the use of a hydraulic cylinder which is subjected to relatively low pressure and thereby reducing the power of requirement for a hydraulic trip and reset system. Suction and longitudinal forces are also taken by the track and roller mechanism thereby minimizing the forces acting on the hydraulic cylinder. A relatively small hydraulic force is required from the hydraulic cylinder to yieldably hold the plow bottom in its normal earth working position. The hydraulic cylinder is the sole power source for holding, biasing and resetting the plow bottom. The track and guide structure is of such design that when the plow engages an obstruction the point of the plow bottom does not go below the normal working depth of the plow bottom as it rides over the obstruction. The track and guide structure is mounted on a frame unit. A guide plate secured to the beam locates the frame unit on the beam. Clamp assemblies vertically and horizontally clamp the frame unit on the plow beam.

It is an object of the invention to provide an improved load holding and release mechanism for the ground working tool of an earth working implement, such as a plow, lister, cultivator and the like having a high clearance beam. Another object is to provide a frame unit for a plow bottom holding and release mechanism that can be clamped to a plow beam. Another object of the invention is to combine with a plow a load holding and release mechanism which allows the plow standard to swing rearwardly and upwardly out of the ground without the plow point going below the plowing depth when the plow share strikes a fixed object, as a stone or the like. Another object of the invention is to provide a plow bottom holding and release mechanism which will yield when the plow bottom hits an object only to the degree necessary to clear the object whereby unplowed areas of a field are kept to a minimum. A further object of the invention is to provide a release mechanism for a plow bottom which will automatically reset without stopping the forward movement of the plow. Still another object of the invention is to provide a plow with an automatic load release mechanism for the plow bottom which can be used in conjunction with a tractor without a hydraulic pressure system.

Figures 1, 2:
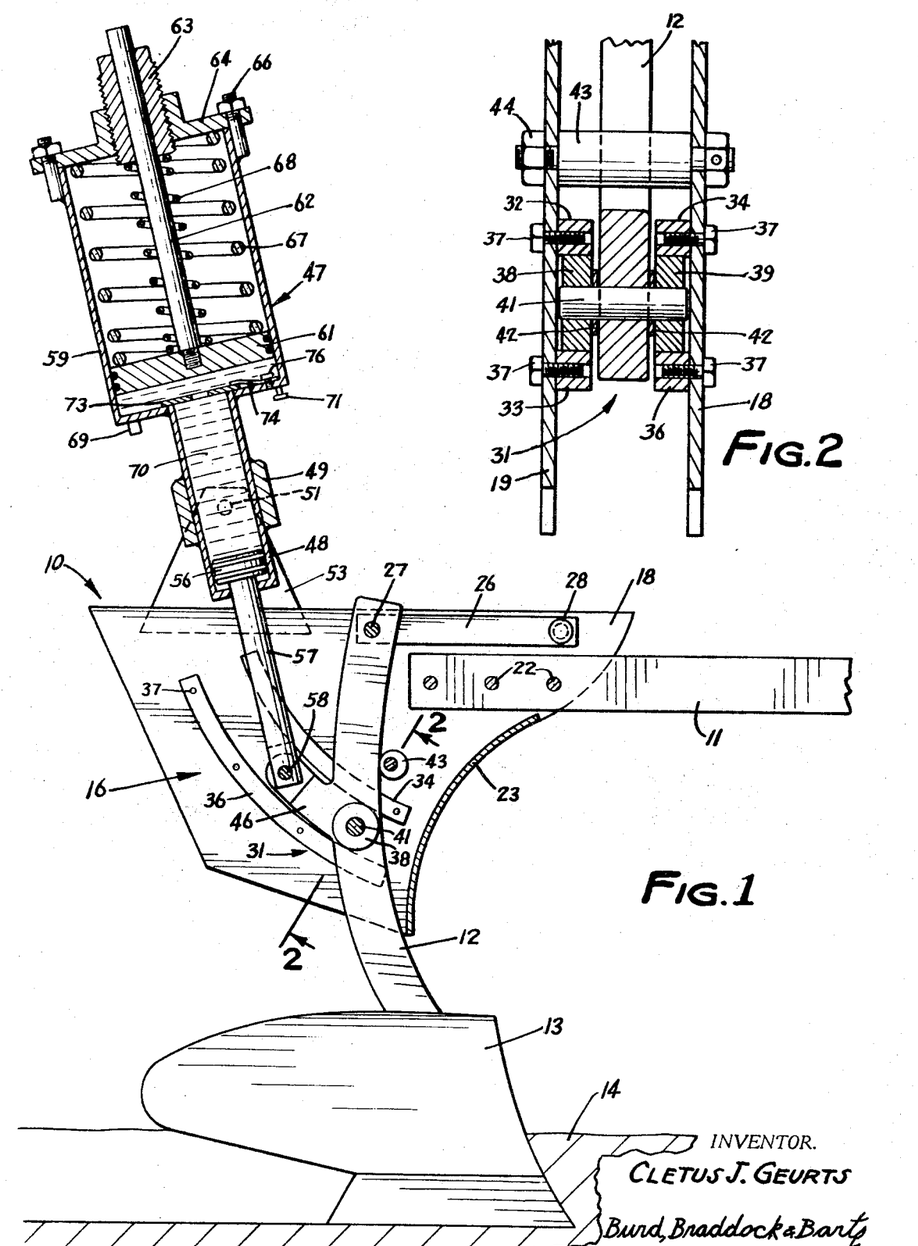
FIG. 1 is a side elevational view of a plow bottom in ground working position attached to a beam by the holding and release mechanism, shown in section, of this invention.
FIG. 2 is an enlarged sectional view taken along the line 2—2 of FIG. 1.

Referring to the drawings, there is shown in FIG. 1 a portion of a conventional mold board plow indicated generally at 10 including a horizontal longitudinal plow beam 11, and an upright standard 12 secured at its lower end to an earth working tool or plow bottom 13 positioned in soil 14. The plow bottom 13 is shown in ground working position. A holding and release mechanism indicated generally at 16 attaches the standard 12 to the beam 11. The mechanism 16 yieldably holds the plow bottom 13 in ground workong position shown in FIG. 1. When the plow share strikes an obstruction 17, such as a rock shown in FIG. 3, the plow bottom moves rearwardly and upwardly to a release or trip position permitting the plow share to ride over the obstruction. Mechanism 16 allows the plow bottom 13 to swing rearwardly and upwardly out of the ground without the share point going below the plowing depth. After the plow share has passed over the obstruction, mechanism 16 automatically resets the plow bottom 13 to the earth working position. This is accomplished without stopping the forward movement of the plow.

Figures 4, 5:
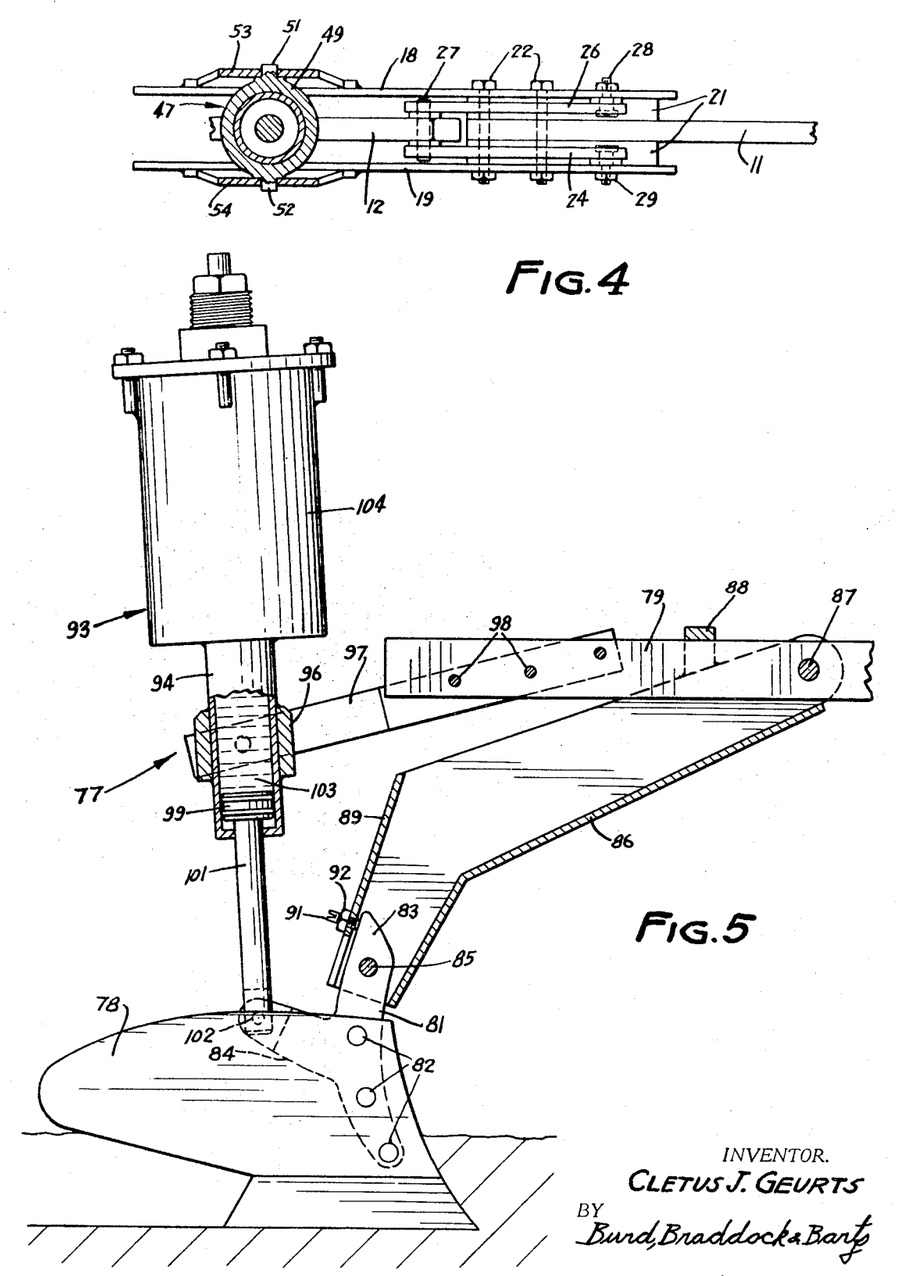
FIG. 4 is a sectional view taken along the line 4—4 of FIG. 3.
FIG. 5 is a side elevational view of a plow bottom in ground working position attached to a beam with a modified holding and release mechanism shown partly in section.

The holding and release mechanism 16 has a support comprising a pair of upright plates 18 and 19 located on opposite sides of the rear end section of the horizontal beam 11. As shown in FIG. 4, blocks 21 space the plates 18 and 19 from the adjacent sides of the beam. Nut and bolt assemblies 22 are used to secure the plates 18 and 19 and spacer blocks 21 to the beam. The front edge of plates 18 and 19 curves downwardly and rearwardly and is reinforced by a transverse web 23. The plates 18 and 19 project rearwardly from the end of the beam 19 on opposite sides of the upright standard 12. The standard 12 curves forwardly in a downward direction. The lower end of the standard 12 is secured by bolts (not shown) to plow bottom 13. The upper end of standard 12 is pivotally connected to a pair of links 24 and 26 by a transverse pin 27 projected through the standard and the ends of the links. The opposite ends of the links are pivoted to the plates 18 and 19 by nut and bolt assemblies 28 and 29 respectively. The links 24 and 26 and standard 12 form an articulated linkage connecting the plow bottom 13 with plates 18 and 19.

Standard 12 is positioned for movement in an upward and rearward direction between the plates 18 and 19. The path of this movement is determined by guide apparatus indicated generally at 31. Secured to the inner faces of plates 18 and 19 are two pairs of upper and lower arcuate track members 32,33 and 34,36 respectively. As shown in FIG. 2, bolts 37 extend through plates 18 and 19 and into the track members to fix the track members to the plates. The space between each pair of track members defines an arcuate way accommodating rollers 38 and 39 rotatably positioned on a transverse pin 41 projected through standard 12. Washers 42 provide clearance spaces between the sides of standard 12 and rollers 38 and 39. The radius of curvature of track members 32,33 and 34,36 is about equal to the distance between the mid-portions of each track member and the axes of the nut and bolt assemblies 28 and 29. The radial center of the arcuate track members is upward and rearward of the axes of the nut and bolt assemblies 28 and 29. The track members have an arcuate length which is equal to about one-eighth of a circle.

When the plow bottom 13 is in the ground working position, as shown in FIG. 1, the standard 12 abuts a stop 43 extended transversely between plates 18 and 19. Stop 43 is an eccentric bolt having a nut 44 which can be adjusted to vary the working angle of the plow share and thereby change the pull or suction of the plow bottom 13 as it moves through the soil.

As shown in FIG. 1, the mid-portion of standard 12 has rearwardly and upwardly projected arm 46 pivoted to a power unit, indicated generally at 47, which biases the standard 12 into engagement with the stop 43, thereby yieldably holding the plow bottom 13 in the ground working position.

Figure 3:
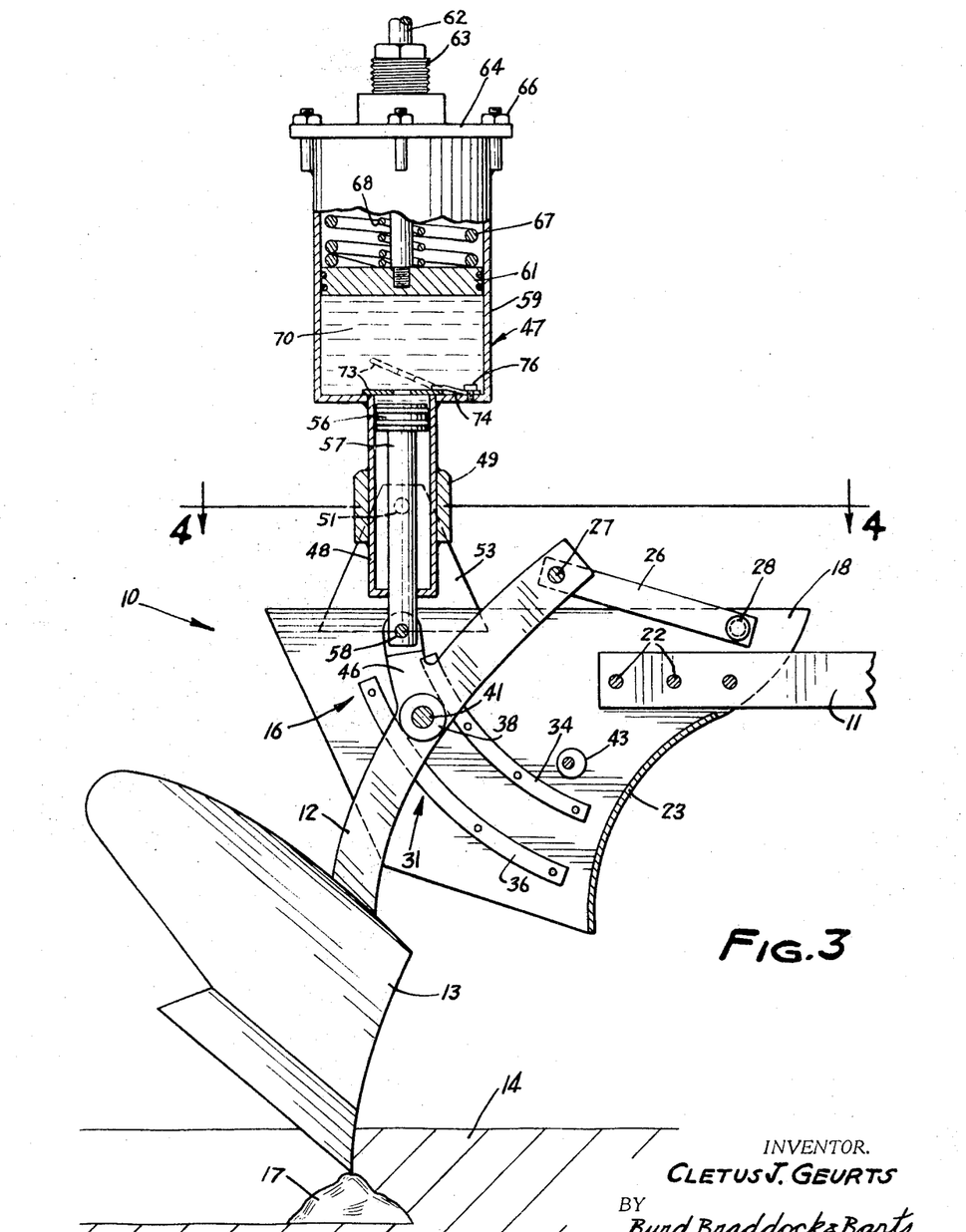
FIG. 3 is a view similar to FIG. 1 showing the plow bottom in the release position.

The power unit 47 in addition to biasing the plow bottom 13 in ground working position functions to absorb and store energy transmitted thereto when the plow bottom strikes an obstruction, as shown in FIG. 3. The power unit 47 comprises a first cylinder 48 secured to a collar 49. As shown in FIG. 4, the collar 49 has oppositely projected ears 51 and 52 extended through holes in top sections of upright plates 53 and 54 secured to plates 18 and 19 respectively. The collar 49 positions the cylinder 48 between plates 53 and 54 for pivotal movement about a horizontal transverse axis.

Slidably disposed in the cylinder 48 is a piston 56 secured to a downwardly projected piston rod 57. Cylinder 48, piston 56 and piston rod 57 are commonly known as a hydraulic cam. The lower end of piston rod 57 is pivotally connected to the outer section of arm 46 by a transverse pin 58 projected through suitable holes in the end of piston rod 57 and arm 46. A large cylinder 59 positioned concentrically with cylinder 48 is secured to the upper end of cylinder 48. Cylinder 48 is open to the bottom of cylinder 59. Slidably positioned in cylinder 59 is a piston 61 secured to an upwardly projected piston rod 62. The piston rod 62 slidably projects through a sleeve 63 threaded into a top closure 64 secured to the upper end of cylinder 59 by fasteners 66, as stud and nut units. Positioned within the cylinder and in bearing engagement with the top of piston 61 and closure member 64 is a large spring 67 which biases the piston 61 in a downward direction. Concentrically positioned about the piston rod 62 is a small spring 68 engageable at opposite ends with the piston 61 and sleeve 63. The compression force of spring 68 may be adjusted by turning the sleeve 63 relative to closure member 64. The bottom of cylinder 59 has a filler coupler 69 used to fill the portions of the cylinders 48 and 59 between the pistons 56 and 61 respectively with hydraulic fluid 70, such as oil. Cylinder 59 also has a bleed cock 71 used to bleed air from cylinder 59.

The flow of hydraulic fluid from cylinder 48 to cylinder 59 is regulated by a one-way flow restrictor washer 73 having a central hole permitting a restricted flow of fluid from the cylinder 59 to cylinder 48. The washer 73 is biased into engagement with the top of cylinder 48 by leaf spring 74 secured at one edge to washer 73 and secured at an opposite edge to the base of cylinder 59 by screw 76.

The hydraulic fluid 70 is placed under high pressure in a large cylinder 59 which is multiplied by using small piston 99. Cylinder 59 serves as an accumulator for the hydraulic fluid subjected to a compressive force by a spring biased piston. The hydraulic fluid may be subjected to the force of compressed gas in lieu of piston 61 and spring 67. The cylinder 59 can be charged with gas, as nitrogen, under high pressure. The cylinder chamber can be divided with a floating piston into a hydraulic chamber and a gas chamber. All of the hydraulic cylinders on the plow can be connected to a single hydraulic pressure source, as an accumulator or directly from a vehicle used to operate the plow.

In use, as shown in FIG. 1, the power unit 47 yieldably holds the plow bottom 13 in the soil working position. The force of the springs 67 and 68 urge the large piston 61 against the hydraulic fluid 70. This force is multiplied by using the smaller piston 56 which is in fluid engagement with the fluid 70. Pistons 56 and 61 are fluidly coupled to each other to transmit the force of springs 67 and 68 to the standard 12. The piston rod 57 acting on the arm 46 pivots the standard 12 about the pivot pin 27 and pivots the links 24 and 26 about the pivot bolts 28 and 29, forcing the standard 12 into engagement with the stop 43.

As shown in FIG. 3, when the plow share strikes an obstruction 17, such as a rock or the like, the force on the plow bottom 13 and standard 12 exceeds the holding force of the power unit 47, pushing the standard 12 upwardly and rearwardly, and driving the piston 56 into the cylinder 48. This forces the hydraulic fluid past the open flow restrictor washer 73, shown by broken lines in FIG. 3, into the large cylinder 59. The hydraulic fluid in the large cylinder 59 raises piston 61 against the biasing force of the springs 67 and 68. The large cylinder acts as an accumulator for storing hydraulic fluid under pressure.

The standard 12 is guided arcuately in an upward and rearward direction by the guide apparatus 31. This causes the standard 12 to pivot rearwardly about pin 27 as well as move the standard 12 in an upright direction about the pivot axes of the bolts 28 and 29. The plow bottom 13 immediately moves upwardly and rearwardly when it strikes an obstruction. The plow share point does not go below normal plowing depth.

After the plow share has passed over the obstruction 17, the power unit 47 automatically forces the plow bottom 13 in a forward direction to the earth working position shown in FIG. 1. Movement of the fluid from the cylinder 59 to the cylinder 48 is restricted by washer 73 to prevent a fast snap or kick of the plow bottom 13 to the earth working position. The plow bottom 13 will automatically move to the earth working position without impeding or stopping the forward motion of the plow. The standard 12 is guided by rollers 38 and 39 along the arcuate ways defined by track members 32,33 and 34,36 until the standard 12 abuts against the stop 43.

Referring to FIG. 5, there is shown a modified holding and release mechanism indicated generally at 77 for operatively attaching a plow bottom 78 to a horizontal plow beam 79. The mechanism 78 comprises an upright standard 81 secured by bolts 82 to plow bottom 78. The standard 81 has an upright arm 83 and a rearwardly directed arm 84. A transverse pin 85 pivotally connects the upright arm 83 to an angle frame 86 having the shape of an upwardly open channel. The forward upper end of frame 86 extends on opposite sides of the beam 79 and is pivotally connected thereto by a horizontal transverse pin 87. Angular movement of frame 86 in a forward direction is limited by an inverted U-shaped stop 88 secured to opposite sides of frame 86 and extended over the plow beam 79. The lower rear end of the frame 86 is enclosed and reinforced by a transverse web 89. A bolt 91 threaded through a nut 92 secured to the lower end of web 89 functions as an adjustable stop for the standard 81. Bolt 91 projects through web 89 and engages the rear side of upright arm 83.

The plow bottom 78 is yieldably held in the ground working position by a power unit 93 which is identical to power unit 47. Power unit 93 includes upright cylinder 94 secured to collar 96 having a pair of ears pivotally mounting the collar on a pair of brackets 97 secured to the end of beam 79 by nut and bolt assemblies 98. The brackets 97 are projected rearwardly and downwardly from the beam 79 on opposite sides of collar 96. Slidably positioned in the cylinder 94 is a piston 99 attached to a downwardly directed piston rod 101. A transverse pin 102 pivotally connects the lower end of the piston rod 101 to the rearward arm 84 of the standard. Hydraulic fluid 103 under pressure urges piston 99 in a downward direction moving the standard 81 in an upright position with the arm 83 in engagement with the end of stop bolt 91 and stop 88 into engagement with the top of plow beam 79. Adjustment of the bolt 91 changes the angular position of the plow share to adjust the downward pull or suction of the plow bottom.

When the plow bottom 78 strikes an obstruction, standard 81 will pivot about the transverse pin 85 and frame 86 will pivot upwardly about the transverse pin 87. This forces the piston 99 into the cylinder 94, forcing the hydraulic fluid 103 upwardly into the large cylinder 104. After the plow bottom 78 has passed over the obstruction, the pressure on the hydraulic fluid 103 forces the piston 99 in a downward direction moving the plow bottom and standard 81 to the ground working position as shown in FIG. 5.

Figure 6:
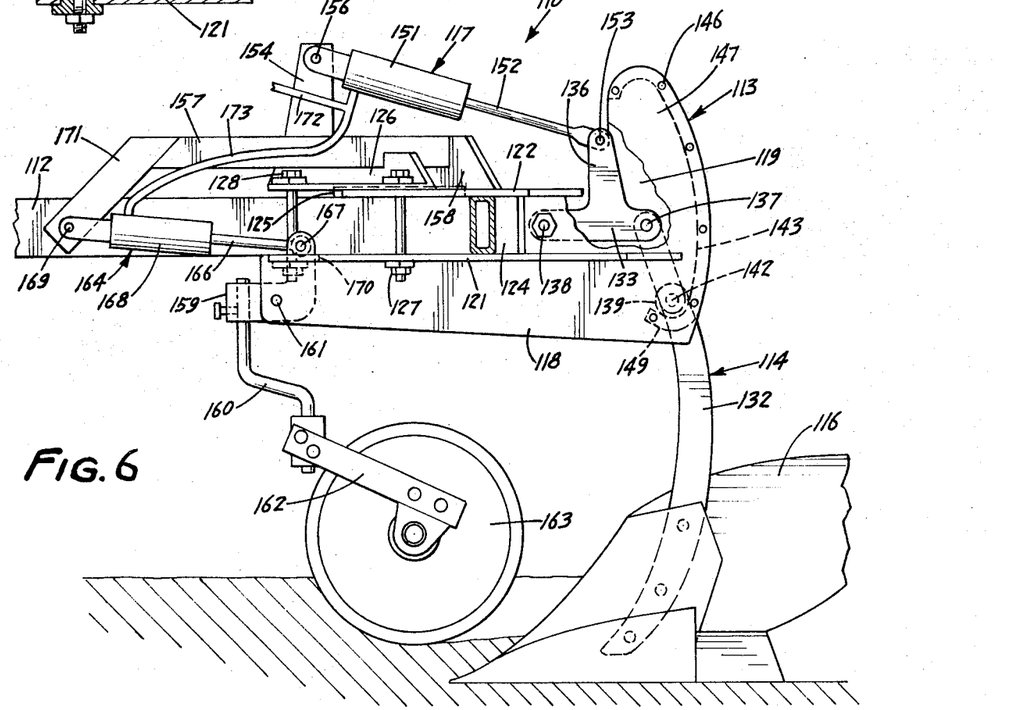
FIG. 6 is a side elevational view of a further modification of a full hydraulic plow bottom holding and release mechanism mounted on a plow beam.
Figures 7, 8:
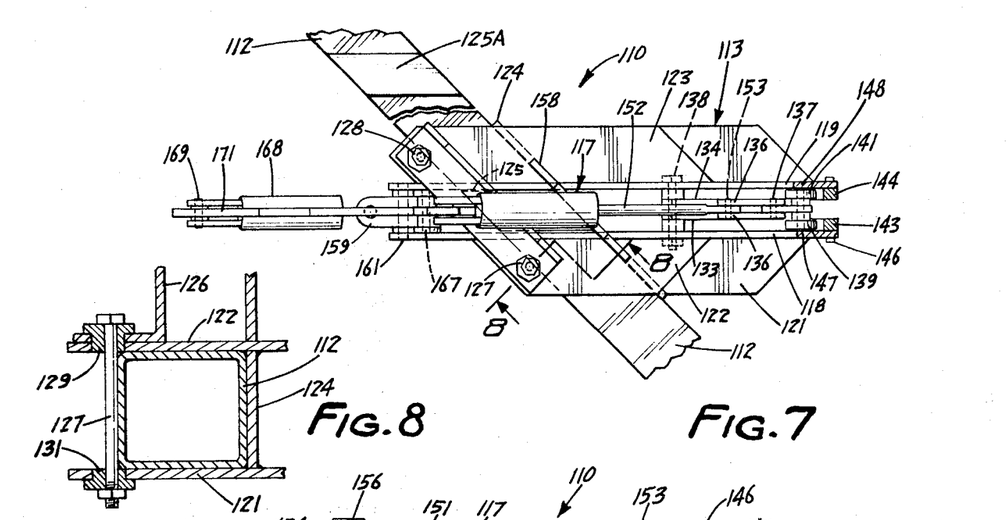
FIG. 7 is a top plan view of FIG. 6.
FIG. 8 is an enlarged sectional view taken along the line 8—8 of FIG. 7.

Referring to FIGS. 6 and 7, there is shown a mold board plow bottom assembly indicated generally at 110 mounted on a diagonal box beam 112 of a plow. The assembly 110 has a frame unit 113 accommodating articulated linkage members 114 connected to an earth working tool shown as a mold board plow bottom 116. The bottom 116 can be replaced with other earth working tools, as a lister, chisel plow, harrow tooth, and like earth working tools. A hydraulic cylinder unit 117 subjected to relatively low pressure is connected to the articulated linkage 114. Unit 117 is an energy storing means comprising a piston and cylinder assembly which operates to continuously store and transmit a force to the linkage member 114 to bias the earth working tool 116 in its forward normal ground working position.

The frame unit 113 has generally parallel upright side members or plates 118 and 119 secured to a bottom generally horizontal plate 121. Outwardly directed top plates 122 and 123 are secured to the top edges of side members 118 and 119. An upright diagonal back plate 124 extends between and is secured to the bottom plate 121 and the top plates 122 and 123. As shown in FIG. 8, plates 121, 122 and 124 form a generally U-shaped structure accommodating the box beam 112. A generally flat positioning block 125 is secured to the top of box beam 112. The side plates 118 and 119 extend adjacent the opposite sides of block 125, thereby locating the frame unit 113 on the box beam without the use of holes in the beam. The block 125 eliminates costly holes in the beam and bolts to attach the frame unit 113 to the beam 112. The beam 112 has additional blocks 125A to locate other frame units on the beam.

Secured to the forward ends of the top plates 122 and 123 is a diagonal angle member 126. Nut and bolt assemblies 127 and 128 located in vertical aligned holes in plates 121 and 123 and angle member 126 function to clamp the frame unit 113 on the diagonal beam 112. Eccentric or off center holders or washers 129 and 131 surrounding end portions of the nut and bolt assemblies 127 and 128 are rotatable to firmly hold, by longitudinally clamping, the frame unit 113 in assembled relation with the box beam 112. The holders along with the nut and bolt assemblies facilitate the mounting of the frame unit on the beams with a minimum of machining and labor. The frame unit 113 is a standard assembly interchangeable with other assemblies having box shaped beams.

Articulated linkage 114 comprises a generally upright standard 132 having a lower end secured to the mold board plow bottom 116. The upper portion of the standard 132 extends between the side plates 118 and 119 and is pivotally connected to a pair of generally horizontal links 133 and 134 with a generally transverse pin 137. The links 133 and 134 have upright arms 136 connected to the hydraulic cylinder unit 117. The forward ends of links 133 and 134 are pivotally connected to side plates 118 and 119 with a transverse pivot pin 138.

Rotatably mounted on standard 132 below pivot pin 137 is a pair of rollers 139 and 141. A transverse axle 142 secured to the standard 132 rotatably mounts the rollers 139 and 141 on opposite sides of the standard. Located on adjacent portions of the insides of side members 118 and 119 are generally upright convex curved tracks 143 and 144 providing cam surfaces for rollers 139 and 141. Bolts 146 secure tracks 143 and 144 to the two rear upright portions 147 and 148 of the side members 118 and 119. As shown in FIG. 6, lower ends of tracks 143 and 144 have upwardly directed curved portions 149 which serve as stops for limiting the forward and downward motion of standard 132. When rollers 139 and 141 engage portions 149, the plow bottom 116 is in its normal earth working position.

The hydraulic cylinder unit 117 comprises a cylinder 151 carrying a piston (not shown) connected to a piston rod 152. A pivot pin 153 connects the outer end of rod 152 to the upper end of arms 136. The head end of cylinder 151 is located adjacent to generally upright support 154. A transverse pivot pin 156 connects the cylinder 151 to the support 154. A longitudinal member 157 secured to angle 126 and transverse diagonal support leg 158 carries the upright support 154. Member 157 is secured to top plates 122 and 123.

Located adjacent the forward lower portions of the side plates 118 and 119 is an angle member 159. A transverse pivot 161 connects the member 159 to side plates 118 and 119. Adjustably connected to the forward end of member 159 is an upright rod or standard 160. Rotatably mounted on the lower end of rod 160 is an upright sleeve 160A secured to a rearwardly directed arm 162 rotatably carrying an upright colter disc 163. The upper end of member 159 is connected to a hydraulic cylinder unit 164. The cylinder unit 164 has a piston rod 166 connected with a pivot member 167 to the upper end of the member 159. The head end of cylinder 168 is connected with a pin 169 to a downwardly directed projection or support 171. Support 171 is connected to the forward end of longitudinal member 157. Member 159 engages a transverse stop edge 170 on plate 121 to limit the pivotal movement of the member, thereby determining the normal ground working position of colter disc 163.

Both hydraulic cylinder units 117 and 164 are connected to a common source of hydraulic fluid under pressure through a hydraulic line 172. A separate hydraulic line 173 connects the cylinder 164 with the line 172. The source of hydraulic pressure can be an accumulator, the hydraulic system of the power unit or tractor operating the plow.

In use, a plow having a plurality of plow bottom assemblies 110 mounted on a diagonal beam 112 is connected to a power unit, as a tractor. Each assembly 110 has articulated connected linkage members 132, 133 and 134 which work with the coacting rollers 139 and 141 and guide tracks 143 and 144 to control the normal working depth of the plow bottom, and the tripping and reset path of the plow bottom. The coacting roller, track and side plate structures provide side or lateral as well as longitudinal and suction force receiving members or anchors for the standard 132. This structure enables the plow beam 112 to be positioned at a relatively high elevation with respect to the ground, giving the plow high ground clearance. A high clearance plow beam is advantageous in the working of extremely trashy fields, as picked corn fields. The lateral forces on the standard 132 are taken by the frame unit 113. This alleviates most of the twisting forces on the pivot pins 137 and 138.

The hydraulic cylinder unit 117 provides a continuous biasing force on arms 136 to hold the articulated linkage 114 in its normal ground working position. This is the only force holding the linkage down. With substantial forces being taken by the coacting roller and track guide means, a relatively low pressure cylinder unit 117 can be used to operate the plow bottom assembly without slamming the standard back to its forward position. When the plow bottom 116 hits an obstruction, the point of the plow bottom 116 will move upwardly without going below its normal working depth. The linkage 132 and 133 folds upwardly against the biasing force of the cylinder unit 117. As soon as the plow bottom passes over the obstruction, the biasing force of the cylinder unit 117 resets or moves the plow bottom back to its normal earth working position. The plow bottom 116 resets without stopping the forward motion of the plow.

The colter disc 163, located forwardly in the plow bottom 116, is biased to its earth working position by the second cylinder unit 164. With both the first cylinder unit 117 and the second cylinder unit 164 connected to a common source of fluid under pressure, both the plow bottom 116 and colter disc 163 are held in their ground working positions with comparable amounts of force.

The hydraulic cylinder units 117 and 164 are located at least at the elevation of the plow beam 112 so they do not interfere with trash or foreign material that may be laying on the ground. When the colter disc 163 strikes an object, as a rock, it will pivot upwardly and ride over the object. The hydraulic cylinder unit 164 is a yieldable link biasing the arm 159 to reset and hold the disc 163 in its ground working position. When the plow bottom 116 strikes an object, as a rock, the plow bottom 116 along with the standard 132 will ride upwardly along the path of tracks 143 and 144, moving the links 133 and 134 in a forward position.

The hydraulic cylinder unit 117 will be contracted as the plow bottom 116 moves upwardly against its hydraulic biasing force. The plow bottom 116 moves out of the ground without the point of the plow share going below the normal working depth. As soon as the plow bottom 116 passes over the object, the hydraulic cylinder unit 117 will force the plow bottom 116 back to its ground working position. This is an automatic operation which is accomplished without stopping, reversing or changing the speed of the plow.

While there has been shown and described preferred embodiments of the invention, it is understood that various changes in the details of the hydraulic holding, release and return mechanism and other structures of the plow, plow bottom and colter may be made by those skilled in the art without departing from the spirit of the invention.

The embodiments of the invention in which an exclusive property or privilege is claimed are defined as follows:

1. In an earth working implement having a beam, the combination of: support means secured to the beam and projected rearwardly therefrom, a movable linkage comprising link means pivotally connected to the support means for movement about an axis transverse of the beam and a generally upright standard pivotally connected to the link means for movement about an axis transverse of the beam, stop means engageable with said standard to limit movement thereof in a forward direction, an earth working tool mounted on a lower portion of said standard, said tool being in a normal ground working position when said standard is in engagement with said stop means, coacting guide means on said standard and support means for directing movement of the standard along a path upwardly and rearwardly away from the stop means guiding the tool between the ground working position and the release position without allowing any portion of the tool to go below the ground working position of the tool, and force storing and transmitting means for continuously biasing the standard into engagement with the stop means, said force storing and transmitting means including a hydraulic ram means having first and second relatively movable members, means pivotally connecting one of said members of the ram means to the link means above said transverse axes, means connecting the other member to the support means, and means for continuously supplying the ram means with hydraulic fluid under pressure to allow the tool to move rearwardly and upwardly to a release position when striking an obstruction against the continuous force of the hydraulic pressure in the ram means and to continuously force the tool back to ground working position in the path determined by the coacting guide means as soon as the tool passes over the obstruction, said force storing and transmitting means being the sole means holding the standard and tool in its ground working position.

2. The structure defined in claim 1 wherein: said means for supplying hydraulic fluid includes an accumulator charged with fluid under pressure and means fluidly connecting the accumulator with the hydraulic ram means.

3. The implement of claim 1 wherein: the support means comprises a pair of spaced upright plate means secured to opposite sides of the beam, said link means and part of the standard located between the spaced upright plate means, said coacting guide means comprising upright curved rails secured to the plate means and roller means riding on the rails rotatably mounted on the opposite sides of the standard.

4. The implement of claim 1 including: clamp means for holding the support means in assembled relation with the beam.

5. The implement of claim 1 including: block means secured to the beam, said support means cooperating with the block means to position the support means on the beam.

6. The structure defined in claim 1 wherein: said link means has an upwardly directed arm, said one of said members of the ram means being connected to the arm.

7. The implement of claim 1 including: clamp means for holding the support means in assembled relation with the beam, said clamp means including upright bolt means and eccentric washer means surrounding the bolt means to horizontally clamp the support means on the beam.

8. In an earth working implement having a substantially horizontal beam, the combination of: upright plate means secured to said beam, stop means secured to a portion of said plate means, a generally upright standard positioned adjacent said upright plate means, link means pivotally connected to the upper end portion of the standard, extended forwardly therefrom, and pivotally connected to said upright plate means, an earth working tool mounted on the lower portion of said standard, coacting guide means on said standard and upright plate means for directing the movement of the standard along a path upwardly and rearwardly toward and away from the stop means whereby the tool moves between a ground working position and a release position without allowing any portion of the tool to go below the working position, power means for storing and transmitting force operable to continuously bias the standard into engagement with the stop means and yieldably hold the standard in engagement with the stop means, said power means having first and second relatively movable elements, and means connecting one of the elements with the link means generally above the pivotal connection of the link means with the standard whereby the power means yieldably holds the tool in ground working position and allows the tool to be moved toward the release position when striking an obstruction and forces the tool to ground working position as soon as the tool passes over the obstruction.

9. The implement of claim 8 wherein: said link means has generally upright arm means, said means connecting one of the elements being mounted on the arm means.

10. The implement of claim 8 wherein: said power means includes a hydraulic cylinder.

11. The implement of claim 8 wherein: said upright plate means comprises a pair of spaced upright plates secured to opposite sides of the beam, said link means and part of the standard located between the spaced plates, said coacting guide means comprising curved rails secured to the plates and roller means riding on the rails rotatably mounted on the standard.

12. In an earth working implement having a beam, the combination of: support means attachable to the beam and projected rearwardly therefrom, linkage means including a pair of pivotally connected members positioned adjacent the support means, means pivotally connecting one of the members to the support means for movement about an axis generally transverse of the support means, arm means secured to said one of the members of the linkage means, an earth working tool mounted on the other of the members, said tool being movable to a normal ground working position and to a release position, force storing and transmitting means for continuously biasing the tool to the ground working position, said force storing and transmitting means including hydraulic ram means having first and second relatively movable elements and means pivotally connecting one of the movable elements of the ram means to the arm means above said transverse axis and the other element to the support means, said ram means connectable to means for continuously supplying the ram means with hydraulic fluid under pressure, coacting guide means on the support means and one of the members for directing movement of the tool upwardly and rearwardly away from the ground working position to the release position without allowing any portion of the tool to go below the ground working position of the tool against the force of the force storing and transmitting means, said force storing and transmitting means continuously biasing the tool to the ground working position.

13. The implement of claim 12 wherein: said support means include a pair of spaced upright plate means mounted on the beam, said pair of pivotally connected members being partially located between said plate means, said coacting guide means comprising curved upright rails secured to the facing sides of the plate means in alignment with each other and roller means riding on the rails rotatably mounted on one of the pair or members.

14. The implement of claim 12 wherein: said means for continuously supplying hydraulic fluid under pressure includes an accumulator charged with fluid under pressure, and means fluidly connecting the accumulator with the hydraulic ram means.

15. The implement of claim 12 wherein: said coacting guide means comprise upwardly and rearwardly directed track means and roller means operable to ride on the track means.

16. The implement of claim 12 including: clamp means for holding the support means in assembled relation with the beam.

17. The implement of claim 12 including: clamp means for holding the support means in assembled relation with the beam, said clamp means including upright bolt means and eccentric washer means surrounding the bolt means to horizontally clamp the support means on the beam.

18. The implement of claim 12 wherein: the support means comprises a frame unit having an upper portion and a lower portion located adjacent opposite sides of the beam and clamp means cooperating with the upper portion and lower portion to hold the frame unit on the beam.

19. The implement of claim 13 including: clamp means for holding the plate means in assembled relation with the beam.

20. The implement of claim 19 including: block means secured to the beam, said plate means cooperating with the block means to position the support means on the beam.

21. The implement of claim 16 including: block means secured to the beam, said support means cooperating with the block means to position the support means on the beam.

22. The implement of claim 18 including: block means secured to the beam, said frame unit cooperating with the block means to position the frame unit on the beam.

23. The implement of claim 18 wherein: the frame unit has a pair of generally upright plates.

24. The implement of claim 18 wherein: the clamp means includes upright bolt means connecting the upper portion and the lower portion and eccentric washer means surrounding the bolt means to horizontally clamp the frame unit on the beam.

25. In an earth tillage implement: a frame, a ground working tool; mounting means connecting said tool to said frame for substantially free, unobstructed movement away from an operating ground-penetrating position toward a fully elevated position above the ground, said mounting means having movable means including a standard secured to the tool, and forwardly projected means secured to the upper portion of the standard and stationary means mounting the forwardly projecting means on the frame, and guide means for guiding said tool during movement between said positions, said stationary means and guide means including first and second guides on said stationary means and first and second follower means on said movable means cooperating respectively with said first and second guides so that when the tool strikes an obstruction it will move rearwardly and upwardly along a fixed path without allowing any portion of the tool to go below its normal earth working depth to clear the obstruction, biasing means having one portion connected to the movable means and a second portion connected to the stationary means for continuously biasing said tool toward said operating ground penetrating position in all positions of said tool, for continuously yielding resisting meovement of said tool away from said ground penetrating position, and for continuously returning said tool to said ground penetrating position after movement away therefrom, and means pivotally mounting the second portion of the biasing means to the stationary means at an elevation higher than the elevation of the forwardly projected means.

26. The tillage implement of claim 25 wherein: said biasing means includes a hydraulic cylinder having its piston rod connected to said movable means mounting said tool.

27. The tillage implement of claim 25 wherein: said first guide includes an upwardly curved track on the stationary means, and said first follower means includes a roller mounted on the movable means and engageable with said track.

* * * * *

PO-1050
(5/69)

UNITED STATES PATENT OFFICE
CERTIFICATE OF CORRECTION

Patent No. 3,760,882      Dated September 25, 1973

Inventor(s) Cletus J. Geurts

It is certified that error appears in the above-identified patent and that said Letters Patent are hereby corrected as shown below:

Claim 13, line 9, "or" should be --of--.

Signed and sealed this 29th day of January 1974.

(SEAL)
Attest:

EDWARD M. FLETCHER, JR.      RENE D. TEGTMEYER
Attesting Officer      Acting Commissioner of Patents